(12) United States Patent
Ke

(10) Patent No.: US 11,604,103 B2
(45) Date of Patent: Mar. 14, 2023

(54) STRESS SENSING ASSEMBLY AND DISPLAY DEVICE

(71) Applicant: AU Optronics Corporation, Hsin-Chu (TW)

(72) Inventor: Tsung-Ying Ke, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 1 day.

(21) Appl. No.: 17/488,348

(22) Filed: Sep. 29, 2021

(65) Prior Publication Data

US 2022/0146336 A1    May 12, 2022

Related U.S. Application Data

(60) Provisional application No. 63/111,698, filed on Nov. 10, 2020.

(30) Foreign Application Priority Data

May 21, 2021 (TW) .................................. 110118541

(51) Int. Cl.
*G06F 3/041* (2006.01)
*G01L 1/06* (2006.01)
*G06F 1/16* (2006.01)
*G09F 9/30* (2006.01)

(52) U.S. Cl.
CPC .............. *G01L 1/06* (2013.01); *G06F 1/1652* (2013.01); *G09F 9/301* (2013.01)

(58) Field of Classification Search
CPC ......... G06F 1/1652; G06F 2203/04102; G09F 9/301; G09G 2380/02; G02F 1/133305; H01L 51/0097
See application file for complete search history.

(56) References Cited

U.S. PATENT DOCUMENTS

| | | | |
|---|---|---|---|
| 2012/0043115 A1* | 2/2012 | Chen | H01L 23/49816 174/254 |
| 2012/0052268 A1* | 3/2012 | Axisa | H01L 23/49838 428/212 |
| 2016/0320878 A1* | 11/2016 | Hong | H01L 27/3244 |
| 2016/0377493 A1 | 12/2016 | Hong et al. | |
| 2017/0277341 A1* | 9/2017 | Lim | H01L 27/323 |
| 2017/0279057 A1* | 9/2017 | Park | H01L 51/0097 |
| 2018/0114491 A1 | 4/2018 | Tokuda | |

(Continued)

FOREIGN PATENT DOCUMENTS

| | | |
|---|---|---|
| CN | 108389884 A | 8/2018 |
| CN | 109923676 A | 6/2019 |

*Primary Examiner* — Joe H Cheng
(74) *Attorney, Agent, or Firm* — WPAT, PC

(57) ABSTRACT

A stress sensing assembly includes: a stretchable substrate and at least one stress sensing line. The stress sensing line is disposed over the stretchable substrate and includes: rigid segments and flexible conductive segments. The rigid segments are separated from each other. Each of the flexible conductive segments is disposed between two adjacent rigid segments of the rigid segments and directly contacts the sidewalls of the two adjacent rigid segments of the rigid segments, and the Young's modulus of one of the flexible conductive segments is smaller than the Young's modulus of one of the rigid segments. A display device including stress sensing assembly is also disclosed herein.

16 Claims, 12 Drawing Sheets

(56) References Cited

U.S. PATENT DOCUMENTS

| | | |
|---|---|---|
| 2020/0211437 A1* | 7/2020 | Ahn ........................ G09G 3/035 |
| 2020/0243778 A1 | 7/2020 | Li |
| 2021/0225961 A1 | 7/2021 | Sun et al. |
| 2022/0061153 A1* | 2/2022 | Ke ........................... H05K 1/181 |
| 2022/0163416 A1* | 5/2022 | Ahn ........................ B41M 3/006 |

* cited by examiner

STRESS SENSING ASSEMBLY AND DISPLAY DEVICE

CROSS-REFERENCE TO RELATED APPLICATION

This application claims priority to U.S. Provisional Application Ser. No. 63/111,698 filed Nov. 10, 2020, and Taiwan Application Serial Number 110118541, filed May 21, 2021, the disclosures of which are incorporated herein by reference in their entireties.

BACKGROUND

Field of Invention

The present disclosure relates to a sensing assembly having a stress sensing line and a display device comprising the sensing assembly.

Description of Related Art

In a flexible electronic device, the substrate of the electronic device is deformed due to stretching, and subsequent operations can be performed through the changes sensed by the sensing components for the deformation. For example, in a flexible display device, pixel compensation for various deformed regions can be performed. However, the sensitivity of current sensing assemblies in flexible electronic devices is not high enough, and a larger amount of deformation is often required to generate detectable changes.

SUMMARY

In view of the above-mentioned problem, some embodiments of the present disclosure provide a stress sensing assembly for a flexible electronic device, which can have a relatively large response capability when the deformation is small.

Some embodiments of the present disclosure provide a stress sensing assembly including: a stretchable substrate and at least one stress sensing line. The stress sensing line is disposed over the stretchable substrate and includes: rigid segments and flexible conductive segments. The rigid segments are separated from each other. Each of the flexible conductive segments is disposed between two adjacent rigid segments of the rigid segments and directly contacts the sidewalls of the two adjacent rigid segments of the rigid segments, and the Young's modulus of one of the flexible conductive segments is smaller than the Young's modulus of one of the rigid segments.

In some embodiments, the flexible conductive segments are separated from each other. In other embodiments, the flexible conductive segments are connected to each other.

In some embodiments, in the stress sensing assembly, each of the flexible conductive segments further overlays and directly contacts the parts of the surfaces of the two adjacent rigid segments of the rigid segments.

In some embodiments, in the stress sensing assembly, the flexible conductive segments further overlay and directly contact the entire upper surfaces of the rigid segments.

In some embodiments, in the stress sensing assembly, the two flexible conductive segments at the two ends of the stress sensing line respectively overlay and directly contact the outer sidewalls of the two rigid segments closest to the two ends of the stress sensing line.

In some embodiments, in the stress sensing assembly, the total length of the rigid segments is X, the total length of the parts of the flexible conductive segments that do not overlap with the rigid segments is Y, and the ratio of Y/X is between about 0.01 and about 3.

In some embodiments, in the stress sensing assembly, the Young's modulus of the stretchable substrate is smaller than the Young's modulus of one of the rigid segments.

In some embodiments, in the stress sensing assembly, the stress sensing line is a bending line, and a bending portion of the bending line is one of the flexible conductive segments.

In some embodiments, in the stress sensing assembly, the material of the rigid segments comprises conductive material, non-conductive material, or a combination thereof.

In some embodiments, in the stress sensing assembly, the Young's modulus of the rigid segments ranges from about 30 GPa to about 400 GPa, and the Young's modulus of the flexible conductive segments ranges from about 0.01 MPa to about 1 GPa.

In some embodiments, in the stress sensing assembly, the Young's modulus of the stretchable substrate ranges from 0.1 MPa to 10 GPa.

In some embodiments, the stress sensing assembly further comprises: at least one strain reading element, at least one reading power line, and two reading terminals disposed over the stretchable substrate. A first terminal of the strain reading element connects the at least one reading power line, a second terminal of the strain reading element connects one of the two reading terminals, a third terminal of the strain reading element connects one end the at least one stress sensing line, and the other of the two reading terminals connects to the other end of the at least one stress sensing line.

Other embodiments of the present disclosure provide a display device including: a stress sensing assembly as discussed in the above and below embodiments, and a plurality of signal lines. The stretchable substrate has non-stretching zones and stretching zones, each of the stretching zones is located between two adjacent non-stretching zones of the non-stretching zones, each of the non-stretching zones has sub-pixels, each of the sub-pixels comprises at least one switching element and a display element connected with the at least one switching element, and the at least one stress sensing line is disposed on one of the stretching zones. The signal lines are disposed on the non-stretching zones and the stretching zones, the signal lines connect the switching element of one of the sub-pixels, and the signal lines and the at least one stress sensing line located on a same stretching zone of the stretching zones are separated from each other and not connected with each other.

In some embodiments, in the display device, the stretchable substrate comprises a first region and a second region, the first region and the second region respectively comprise non-stretching zones and stretching zones, and the stretching ratio of the first region is greater than the stretching ratio of the second region. Further, the total length of the rigid segments is X, the total length of the parts of the flexible conductive segments that do not overlap with the rigid segments is Y, and the Y/X ratio of the at least one stress sensing line of one of the stretching zones in the first region is greater than the Y/X ratio of the at least one stress sensing line of one of the stretching zones in the second region.

In some embodiments, in the display device, the Y/X ratio of the stress sensing line is between about 0.01 to about 3.

In some embodiments, in the display device, the Y/X ratio of the at least one stress sensing line located in the first region is between about 0.2 to about 3.

In some embodiments, in the display device, the Y/X ratio of the at least one stress sensing line located in the second region is between about 0.01 to about 0.5.

Yet other embodiments of the present disclosure provide a display device including a stress sensing assembly as discussed in the embodiments above and below, and a plurality of signal lines. The stretchable substrate has non-stretching zones and stretching zones, each of the stretching zones is located between two adjacent non-stretching zones of the non-stretching zones, each of the non-stretching zones has sub-pixels, each of the sub-pixel comprises at least one switching element and a display element connected with the at least one switching element, and the at least one stress sensing line is disposed on one of the stretching zones. The signal lines are disposed on the non-stretching zones and the stretching zones, the signal lines connect the switching element of one of the sub-pixels, and the signal lines and the at least one stress sensing line located on a same one of the stretching zones are separated from each other and not connected with each other. The stress sensing assembly further comprises at least one strain reading element, at least one reading power line, and two reading terminals disposed over the stretchable substrate. A first terminal of the strain reading element connects the reading power line, a second terminal of the strain reading element connects one of the two reading terminals, a third terminal of the strain reading element connects one end the at least one stress sensing line, and the other of the two reading terminals connects the other end of the at least one stress sensing line. In the display device, each of the non-stretching zone further comprises at least one strain reading element, and within a same one of the non-stretching zones, the at least one strain reading element and the at least one switching element and the display element of one of the sub-pixels are separated from each other and not connected with each other.

Yet other embodiments of the present disclosure provide a display device including a stress sensing assembly as discussed in the embodiments above and below, and a plurality of signal lines. The stretchable substrate has non-stretching zones and stretching zones, each of the stretching zones is located between two adjacent non-stretching zones of the non-stretching zones, each of the non-stretching zones has sub-pixels, each of the sub-pixels comprises at least one switching element and a display element connected with the at least one switching element, and the at least one stress sensing line is disposed on one of the stretching zones. The signal lines are disposed on the non-stretching zones and the stretching zones, the signal lines connect the switching element of one of the sub-pixels, and the signal lines and the at least one stress sensing line located on a same one of the stretching zones are separated from each other and not connected with each other. The stress sensing assembly further comprises at least one strain reading element, at least one reading power line, and two reading terminals disposed over the stretchable substrate. A first terminal of the strain reading element connects the at least one reading power line, a second terminal of the strain reading element connects one of the two reading terminals, a third terminal of the strain reading element connects one end the at least one stress sensing line, and the other of the two reading terminals connects the other end of the at least one stress sensing line. In the display device, the at least one reading power line is disposed on one of the stretching zone, wherein the signal lines and the at least one reading power line on the same one of the stretching zones are separated from each other and not connected with each other.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
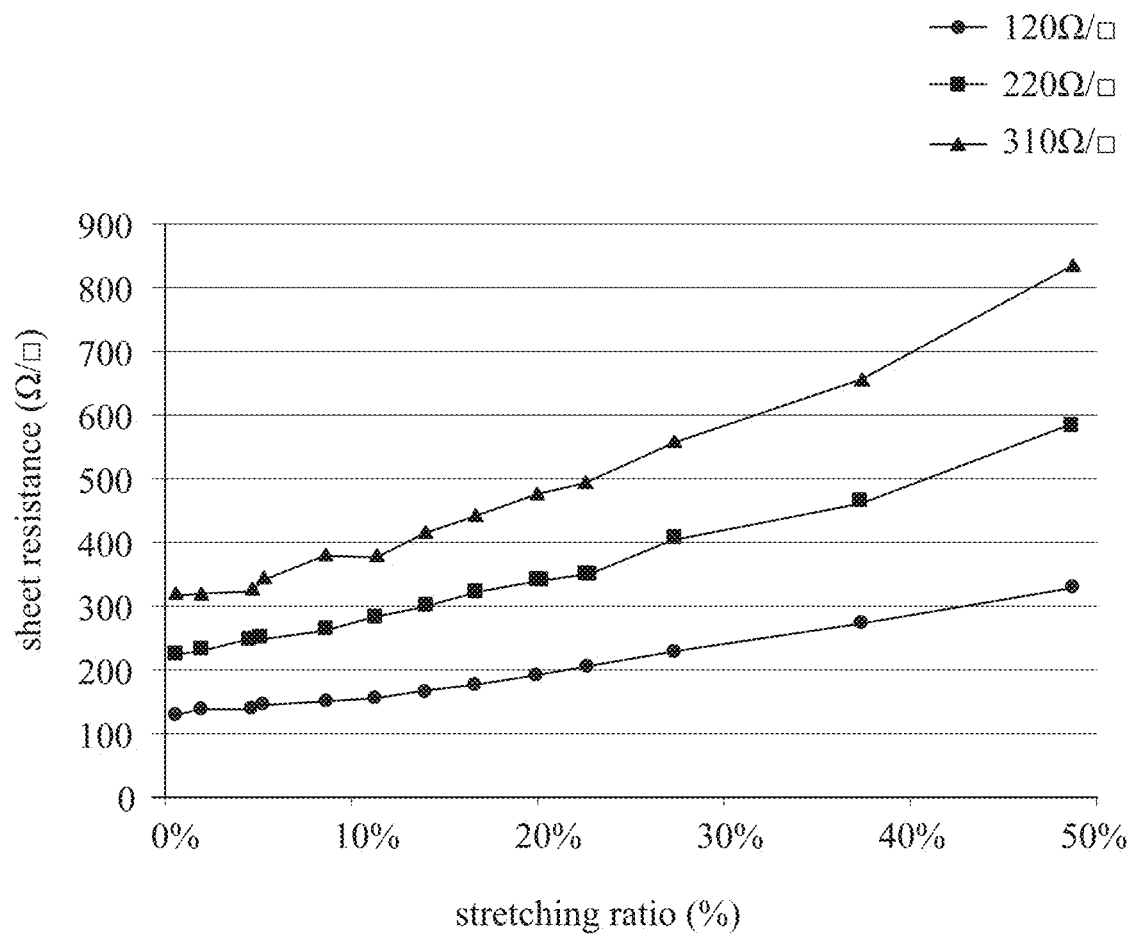
FIG. 1 illustrates the relationship between the stretching ratio of the flexible conductive material and the sheet resistance.

The following will clearly illustrate the spirit of this disclosure with the drawings and detailed description. After understanding the preferred embodiments and examples of the disclosure, any person having ordinary skill in the art can change and modify the technology taught by the disclosure without departing from the spirit and scope of the disclosure.

Throughout the specification, the same reference numerals refer to the same elements. It is understood that when an element, such as a layer, a film, a region or a substrate is said to be "on" or "connected" to another element, it may be directly on or connected to another element, or an intermediate element may also exist. On the contrary, when an element is referred to as being "directly on another component" or "directly connected" to another component, there is no intermediate element. As used herein, "connection" may refer to a physical and/or electrical connection. Furthermore, "electrical connection" or "coupling" can mean that other element(s) exist between two elements.

It is understood that although the terms "first", "second", "third", or the like may be used herein to describe various elements, components, regions, layers and/or portions, but these elements, components, regions and/or portions should not be limited by these terms. These terms are only used to distinguish one element, component, region, layer or portion from another element, component, region, layer or portion. Therefore, the first element, component, region, layer, or portion discussed below may be referred to as the second element, component, region, layer, or portion without departing from the teachings of the disclosure.

The terminology used here is for description of particular embodiments only and is not limiting. As used herein, the singular forms "one", "a" and "the" are intended to include the plural forms, including "at least one", unless the context clearly indicates otherwise. "Or" means "and/or". As used herein, the term "and/or" includes any and all combinations of one or more related listed items. It is also understood that when used in this specification, the terms "comprising" and/or "including" specify the presence of stated features, regions, integers, steps, operations, elements and/or components, but do not exclude the presence or addition of one or more other features, regions, steps, operations, elements, components and/or combinations thereof.

In addition, spatial relative terms such as "lower" or "bottom" and "upper" or "top" can be used to describe the relationship between one element and another element, as shown in the figures. It is understood that the spatial relative terms are intended to include different orientations of the device other than those shown in the figures. For example, if the device in one figure is turned upside down, the element described as being on the "lower" side of other elements will be oriented on the "upper" side of said other elements. Thus, the exemplary term "lower" can include both "lower" and "upper" orientations, depending on the particular orientation of the appended figures. Similarly, if the device in one figure is turned upside down, the element described as "below" or "under" other elements will be oriented as "above" said other elements. Therefore, the exemplary term "below" or "under" may include above and below orientations.

As used herein, "about", "approximate", or "substantially" includes the stated value and an average value within an acceptable deviation range of a specific value determined by one of ordinary skill in the art, and the measurement in question and a specific number of errors related to the measurement (i.e., limitations of the measurement system) are taken into account. For example, "about" may mean within one or more standard deviations of the value, or within ±30%, ±20%, ±10%, or ±5%. Furthermore, the terms "about," "approximately," or "substantially" as used herein may be used to select a more acceptable range of deviations or standard deviations depending on the optical properties, etching properties, or other properties, rather than one standard deviation for all properties.

Unless otherwise defined, all terms used herein, including technical and scientific terms, have the same meaning as commonly understood by one of ordinary skill in the art of the invention. It will be further understood that terms such as those defined in commonly used dictionaries shall be construed to have a meaning consistent with their meaning in the context of the relevant art, and the invention and will not be construed to have an idealized or overly formal meaning unless explicitly defined as such herein.

Exemplary embodiments are described herein with reference to schematic top views of idealized embodiments. Thus, a change in shape of the illustration as a result of, for example, manufacturing techniques and/or tolerances can be expected. Accordingly, the embodiments described herein should not be construed as being limited to a particular shape of the region as shown herein, but include, for example, manufacturing-induced shape deviations. For example, regions shown or described as flat can often have rough and/or non-linear characteristics. In addition, the sharp corners shown may be rounded. Therefore, the regions shown in the figures are schematic in nature, and their shapes are not intended to show the exact shape of the regions, and are not intended to limit the scope of the claims.

FIG. 1 shows the relationship between the stretching ratio (%) and sheet resistance ($\Omega/\square$, or ohm/square) of three flexible conductive materials. The three flexible conductive materials are poly-3,4-ethylenedioxythiophene (PEDOT), which have resistances of 120$\Omega/\square$, 220$\Omega/\square$ and 310$\Omega/\square$ respectively when the three flexible conductive materials are not stretched. With the increase of the stretching ratio, it can be seen that the sheet resistance of the three flexible conductive materials also increases substantially linearly. Therefore, the tensile strain of the flexible conductive material can be sensed by the effect that the resistance of the flexible conductive material increases with the stretching ratio.

FIG. 1 also shows that when the three flexible conductive materials are stretched from an unstretched state to a stretching ratio of 50%, the increases of the sheet resistances are less than 3 times. Therefore, if the stress sensing line is formed only of flexible conductive material, the response of the stress sensing line to tensile deformation may not be sensitive enough.

Figure 2A:
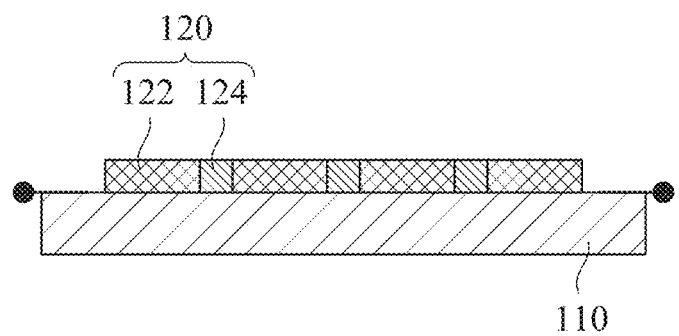
FIG. 2A is a cross-sectional view of a stress sensing assembly according to some embodiments of the present disclosure.

FIG. 2A is a cross-sectional view of a stress sensing assembly according to some embodiments of the present disclosure. The stress sensing assembly 100 comprises a stretchable substrate 110 and a stress sensing line 120. The stress sensing line 120 is composed of a plurality of mutually separated rigid segments 122 and a plurality of mutually separated flexible conductive segments 124. In other words, the stress sensing line 120 is composed of rigid segments 122 and flexible conductive segments 124 arranged alternately. Alternatively, in the stress sensing line 120, the rigid material is disconnected and discontinuous, and the flexible conductive segments 124 fill the disconnected intervals respectively between two segments of the rigid material. In some embodiments, the upper surfaces of the rigid segments 122 and the upper surfaces of the flexible conductive segments 124 are substantially flush.

Figure 2B:
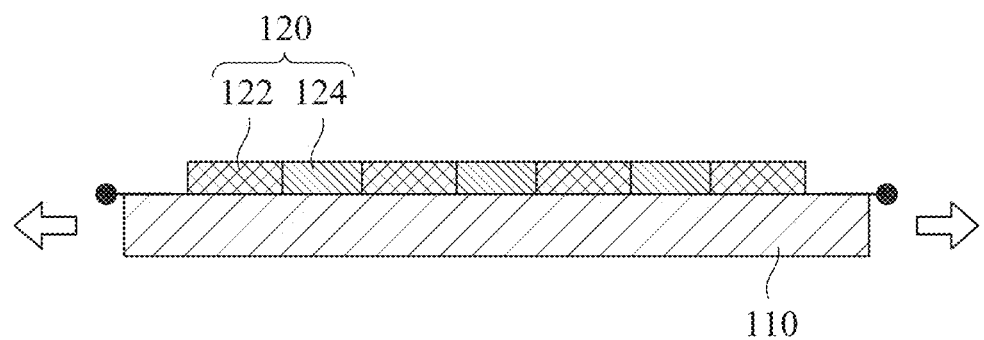
FIG. 2B is a cross-sectional view of the stress sensing assembly of FIG. 2A after it is stretched.

FIG. 2B illustrates a cross-sectional view of the stress sensing assembly 100 of FIG. 2A after it is stretched. The arrows near both sides indicate the direction of stretching. Under the force of tensile stress, the lengths of the flexible conductive segments 124 of the stress sensing line 120 can be extended, while the lengths of the rigid segments 122 are substantially unchanged.

In some embodiments, the Young's modulus of the stretchable substrate 110 of the stress sensing assembly 100 ranges from about 0.1 MPa to about 10 GPa, for example, about 0.1 MPa, about 1 MPa, about 10 MPa, about 100 MPa, about 1 GPa, or about 10 GPa. The material of the stretchable substrate 110 may include polyimide (PI), polyethylene terephthalate (PET), polysiloxanes, polyurethane, epoxy, or the like.

In some embodiments, the Young's modulus of the rigid segments 122 of the stress sensing line 120 ranges from about 30 GPa to about 400 GPa, such as about 30 GPa, about 50 GPa, about 100 GPa, about 150 GPa, about 200 GPa, about 250 GPa, about 300 GPa, about 350 GPa, or about 400 GPa. In some embodiments, the material of the rigid segments 122 may be metal, such as titanium, aluminum, molybdenum, silver, copper, gold, or a combination thereof. In other embodiments, the rigid segments 122 can be made of conductive oxides, such as indium tin oxide.

In some embodiments, the Young's modulus of the flexible conductive segments 124 of the stress sensing line 120 ranges from about 0.01 MPa to about 1 GPa. In some embodiments, the material of the flexible conductive segment 124 comprises a conductive polymer material, such as poly-3,4-ethylenedioxythiophene (PEDOT). In some embodiments, the material of the flexible conductive segment 124 comprises a conductive polymer composite material, such as silver nano-wire in polymer, silver nano-sheet in polymer, copper nano-particle in polymer, or conductive nano- or micro-material in polymer.

In some embodiments, the Young's modulus of the rigid segments 122 is greater than the Young's modulus of the stretchable substrate 110 and the Young's modulus of the flexible conductive segment 124. In some embodiments, the Young's modulus of the stretchable substrate 110 is greater than the Young's modulus of the flexible conductive segments 124.

In some embodiments, in a stress sensing line 120, the total length of the rigid segments 122 is X, the total length of the flexible conductive segments 124 is Y, and 3≥Y/X≥0.01, for example, the ratio of Y/X may be 3, 2.8, 2.5, 2, 1.5, 1, 0.5, 0.2, 0.1, 0.05, or 0.01. When the total length of the flexible conductive segments 124 accounts for a smaller proportion of the stress sensing line (i.e., smaller Y/X), the tensile deformation caused by the stretching will be more concentrated in each of the flexible conductive segments, and therefore the resistance change ratio becomes larger, i.e., the stress sensing line is more sensitive. The ratio of Y/X may be adjusted depending on the required sensitivity of the stress sensing line 120.

In some embodiments, the spacing size between two adjacent rigid segments 122 depends on the process conditions, for example, the smallest spacing size is about 1 micrometer (μm) or greater than 1 μm.

Figure 3A:
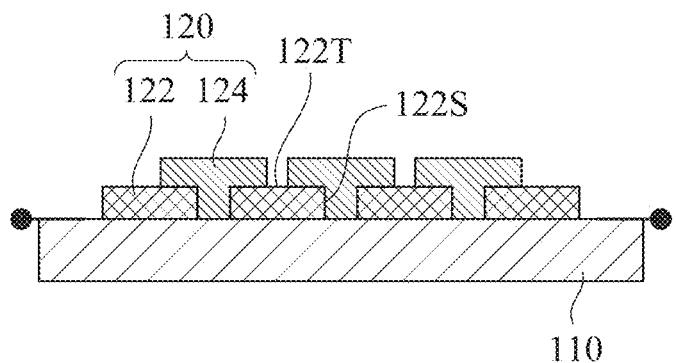
FIG. 3A is a cross-sectional view of a stress sensing assembly according to some embodiments.

FIG. 3A is a cross-sectional view of a stress sensing assembly according to other embodiments. The stress sensing assembly 100' includes a stretchable substrate 110 and a stress sensing line 120. The stretchable substrate 110 is similar to the stretchable substrate 110 of FIG. 2A discussed above. The stress sensing line 120 includes a plurality of rigid segments 122 and a plurality of flexible conductive segments 124.

In some embodiments, in the stress sensing assembly 100', the rigid segments 122 of the stress sensing line 120 are formed of conductive materials, which may be referred to the materials of the rigid segments 122 of FIG. 2A discussed above.

In some embodiments, in the stress sensing assembly 100', the flexible conductive segments 124 of the stress sensing line 120 comprise a conductive polymer or a conductive polymer composite material, which may be referred to the material of the flexible conductive segments 124 of FIG. 2A discussed above.

In the stress sensing assembly 100', the upper surfaces of the flexible conductive segments 124 are higher than the upper surfaces of the rigid segments 122. Each of the flexible conductive segments 124 contacts the sidewalls 122S and parts of the upper surfaces 122T of the two adjacent rigid segments 122.

Figure 3B:
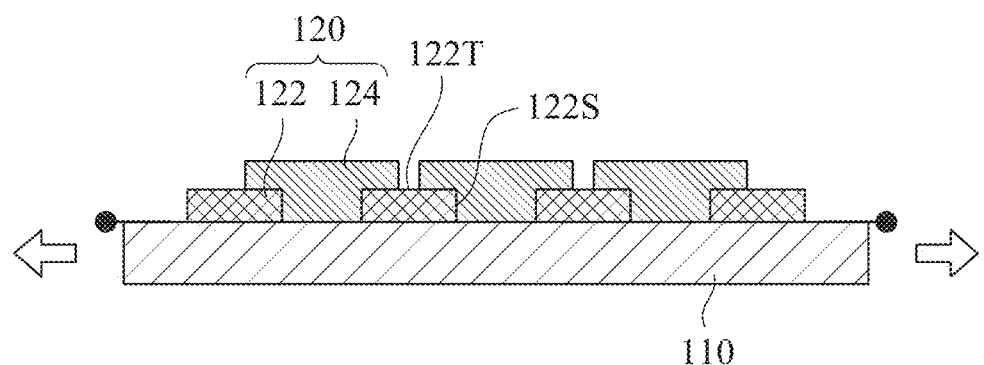
FIG. 3B is a cross-sectional view of the stress sensing assembly of FIG. 3A after it is stretched.

FIG. 3B illustrates a cross-sectional view of the stress sensing assembly 100' of FIG. 3A after it is stretched. The arrows near both sides indicate the direction of stretching. Under the force of tensile stress, the lengths of the flexible conductive segments 124 of the stress sensing line 120 can be extended at the interval between two rigid segments 122, while the lengths of the rigid segments 122 are substantially unchanged.

Figure 4A:
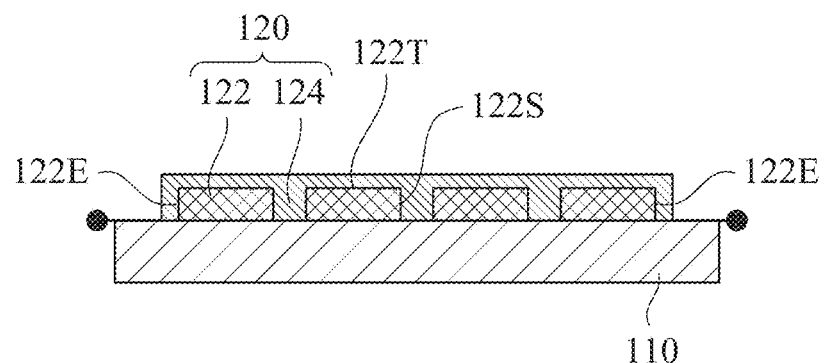
FIG. 4A is a cross-sectional view of a stress sensing assembly according to some embodiments.

FIG. 4A is a cross-sectional view of a stress sensing assembly according to still other embodiments. The stress sensing assembly 100" comprises a stretchable substrate 110 and a stress sensing line 120. The stretchable substrate 110 is similar to the stretchable substrate 110 of FIG. 2A discussed above. The stress sensing line 120 comprises a plurality of rigid segments 122 and a plurality of interconnected flexible conductive segments 124.

In some embodiments, in the stress sensing assembly 100", the material of the rigid segments 122 of the stresses sensing line 120 is composed of conductive material, which may be referred to the materials for the rigid segments 122 of FIG. 2A discussed above. In other embodiments, the material of the rigid segments 122 of stress sensing line 120 is composed of non-conductive material, such as silicon nitride, silicon oxide, amorphous silicon, poly-silicon, organic resin, the like, or a combination thereof.

In some embodiments, in the stress sensing assembly 100", the flexible conductive segments 124 of the stress sensing line 120 comprises conductive polymers or conductive polymer composite materials, which may be referred to the materials for the flexible conductive segments 124 of FIG. 2A discussed above.

In the stress sensing assembly 100", the flexible conductive segments 124 of the stress sensing line 120 are interconnected and overlay the rigid segments 122. In other words, the interconnected flexible conductive segments 124 overlay and directly contact the entire upper surfaces 122T of the rigid segments 122. Further, the two flexible conductive segments 124 respectively at two ends of the stress sensing line 120 further respectively overlay and directly contact the outer sidewalls 122E of the two rigid segments 122 closest to the two ends of the stress sensing line 120.

Figure 4B:
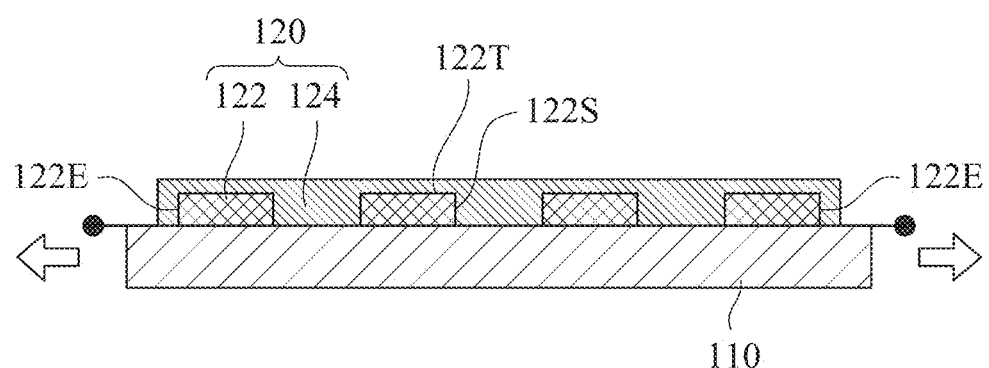
FIG. 4B is a cross-sectional view of the stress sensing assembly of FIG. 4A after it is stretched.

FIG. 4B illustrates a cross-sectional view of the stress sensing assembly 100" of FIG. 4A after it is stretched. The arrows near both sides indicate the direction of stretching. Under the force of tensile stress, the lengths of the flexible conductive segments 124 of the stress sensing line 120 may be extended at the interval between any two rigid segments 122, while the lengths of the rigid segments 122 are substantially unchanged.

In some embodiments, the method of forming the stress sensing assembly comprises forming a plurality of separated rigid segments arranged in a first direction on a stretchable substrate, then disposing a layer of flexible conductive material extending in the first direction, in respective intervals between the rigid segments, and overlaying the rigid segments. In some embodiments, a process such as chemical mechanical polishing may be performed, such that the flexible conductive material layer is formed into a plurality of separated flexible conductive segments, and the upper surfaces of the rigid segments and the flexible conductive segments are substantially flush. In other embodiments, some portions of the flexible conductive material layer may be removed by a patterning process, such that the flexible conductive material layer is formed into a plurality of separated flexible conductive segments, and each of the flexible conductive segments overlays at least one part of an adjacent rigid segment.

Figure 5A:
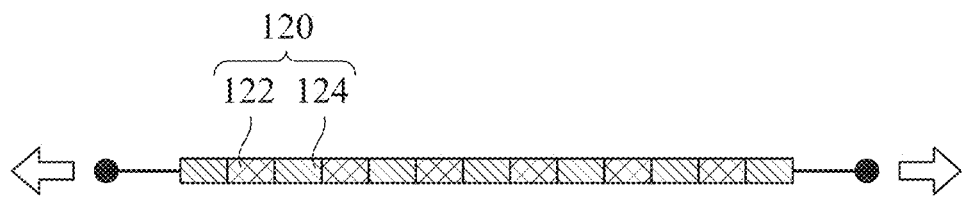
FIG. 5A illustrates a top view of a stress sensing assembly according to some embodiments.

FIG. 5A illustrates a top view of a stress sensing assembly according to some embodiments of the present disclosure. The arrows near both sides indicate the direction of stretching. It can be seen from the top view that the stress sensing line 120 of the stress sensing assembly 100 is a straight line, which consists of alternating rigid segments 122 and flexible conductive segments 124.

Figure 5B:
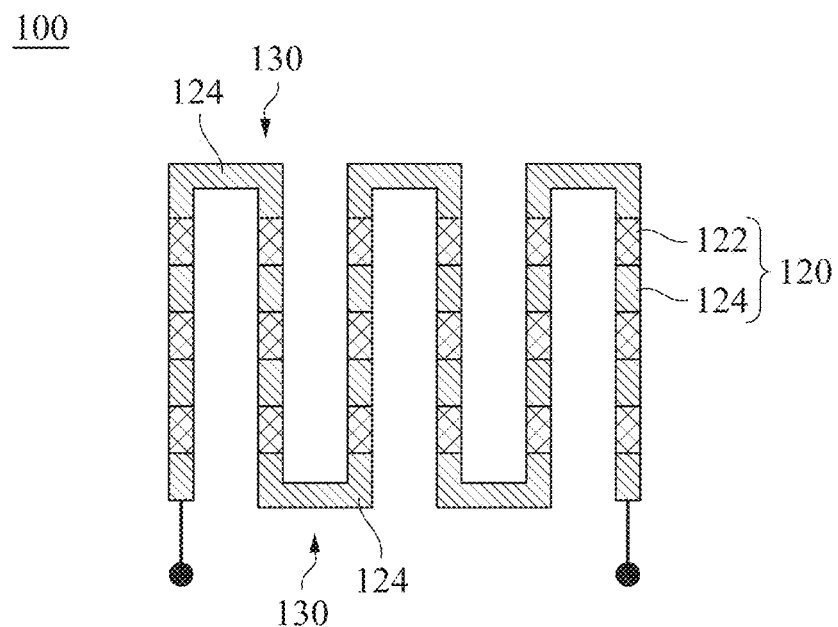
FIG. 5B illustrates a top view of a stress sensing assembly according to some embodiments.

FIG. 5B illustrates a top view of another stress sensing assembly according to some embodiments of the present disclosure. It can be seen from the top view that the stress sensing line 120 of the stress sensing assembly 100 is curved and includes a plurality of bending portions 130. Further, the sections of the stress sensing line 120 located at the bending portions 130 are respective flexible conductive segments 124. Because the stress sensing lines connected in series can obtain a larger resistance change ratio, when the stress sensing lines of a device needs a larger resistance change ratio, a longer stress sensing line may be formed and made into a bending line to obtain a stronger response signal and improve the sensing sensitivity. The arrows near both sides indicate the direction of stretching. The bending portions of the stress sensing line are formed of the flexible conductive segments, so that the stress sensing line has better tensile performance and can avoid the stress sensing line from breaking due to tensile forces.

The following tests of comparative examples and examples show that after the stress sensing devices according to the embodiments of the present disclosure are stretched, the tensile deformation of the stress sensing line is concentrated in the positions of the flexible conductive segments, so that the resistance change ratio of the stress sensing line can be enlarged.

Figure 6A:
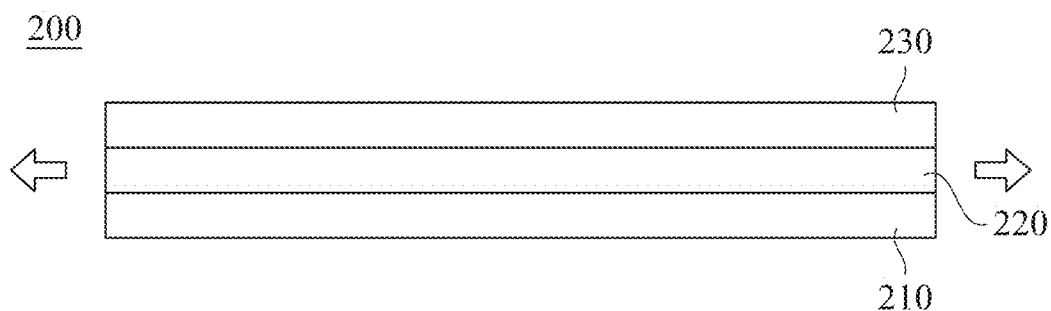
FIG. 6A illustrates a cross-sectional view of a comparative example.

FIG. 6A illustrates a cross-sectional view of comparative example 1. The assembly 200 of comparative example 1 includes a stretchable substrate 210, a rigid material layer 220 on the stretchable substrate, and a flexible conductive material layer 230 on the rigid material layer 220. In comparative example 1, the material of the rigid material layer 220 is a three-layer structure of titanium-aluminum-titanium, and the material of the flexible conductive material layer 230 is a resin having nano-silver wires.

Figure 6B:
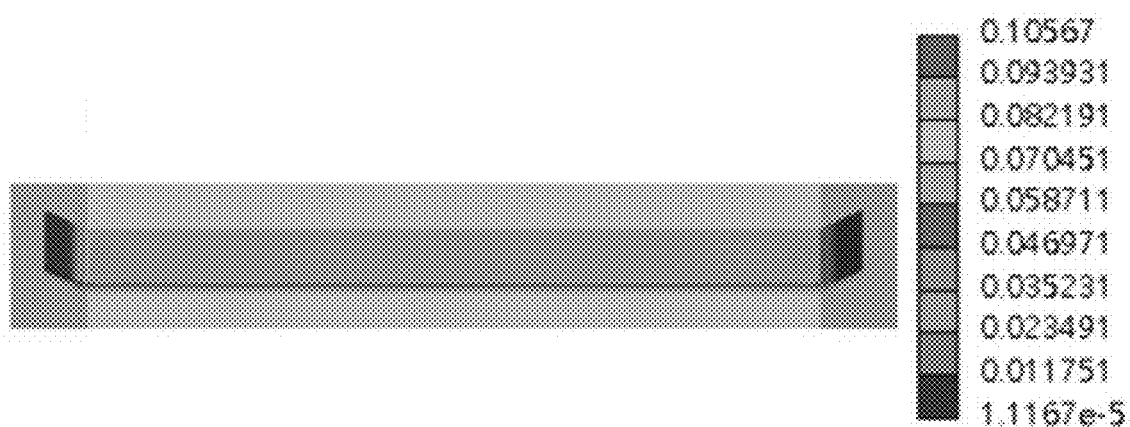
FIG. 6B shows the stretching ratio distribution diagram of the comparative example of FIG. 6A after it is stretched.

FIG. 6B shows the stretching ratio distribution diagram of the assembly 200 of comparative example 1 after it is stretched. In FIG. 6B, the stretching ratios of different degrees are expressed by color scales (or gray scales), and the number beside each color scale (or gray scale) indicate the stretching ratio of that scale; for example, 0.1 means the stretching ratio of 10%. As shown in FIG. 6B, after the assembly 200 is stretched, the stretching ratio is approximately uniform in the region between the two ends of the assembly 200, and the stretching ratio is between about 5.9% to about 7%.

Figure 7A:
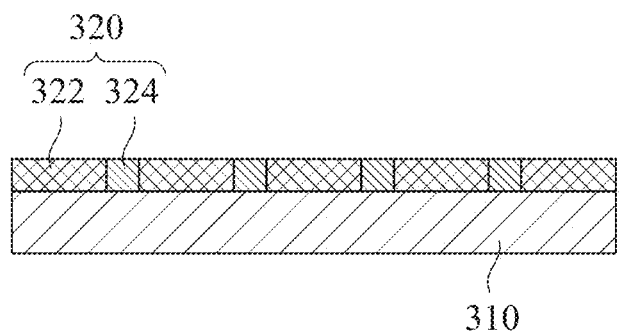
FIG. 7A illustrates a cross-sectional view of an example.

FIG. 7A illustrates a cross-sectional view of example 1. The stress sensing assembly 300 includes a stretchable substrate 310 and a stress sensing line 320. The stress sensing line 320 includes alternating the rigid segments 322 and the flexible conductive segments 324. In example 1, the material of the rigid segment 322 is a three-layer structure of titanium-aluminum-titanium, and the material of the flexible conductive segment 324 comprises nano silver wire.

Figure 7B:
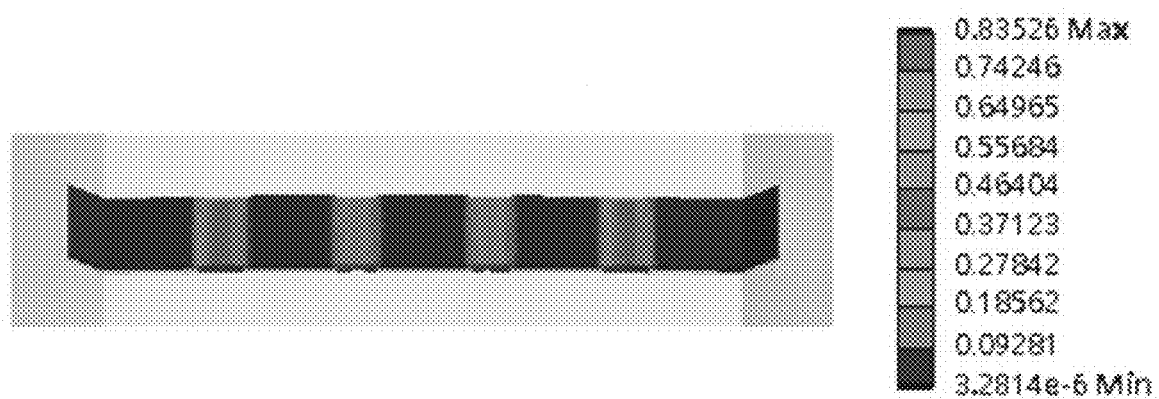
FIG. 7B shows a stretching ratio distribution diagram of the example of FIG. 7A after it is stretched.

FIG. 7B shows a stretching ratio distribution diagram of the stress sensing assembly 300 of example 1 after it is stretched. The number beside each gray scale indicates the stretching ratio of that scale. As shown in FIG. 7B, after the stress sensing assembly 300 is stretched, the sections of the rigid segments 322 of the stress sensing assembly 300 have almost no stretching, and the sections of the flexible conductive segments 324 have stretching ratio between 19% and 47%.

Figure 8A:
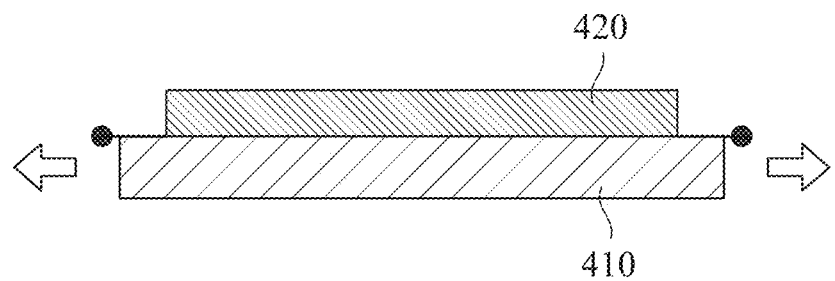
FIG. 8A illustrates a cross-sectional view of a comparative example.

FIG. 8A illustrates a cross-sectional view of comparative example 2. An assembly 400 of comparative example 2 includes a stretchable substrate 410 and a flexible conductive material layer 420 on the stretchable substrate 410. In comparative Example 2, the material of the flexible conductive material layer 420 is a conductive polymer of PEDOT.

Figure 8B:
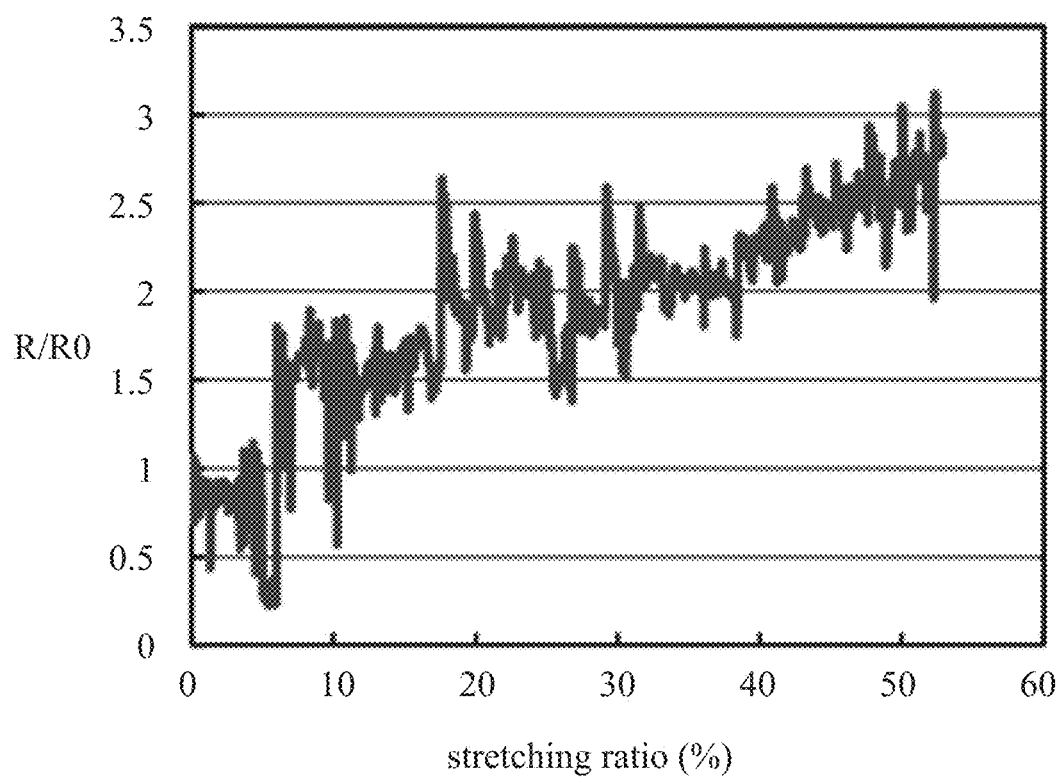
FIG. 8B shows the relationship between the stretching ratio and the resistance change ratio of the comparative example of FIG. 8A.

FIG. 8B shows the relationship between the stretching ratio and the resistance change ratio (R/R0) of comparative example 2 of FIG. 8A. It can be seen that with the increase of the stretching ratio of the assembly 400, the resistance change ratio gradually increases. When the stretching ratio of the assembly 400 is from the unstretched state to the stretching ratio of 50%, the resistance change ratio increases by about 3 times.

Figure 9A:
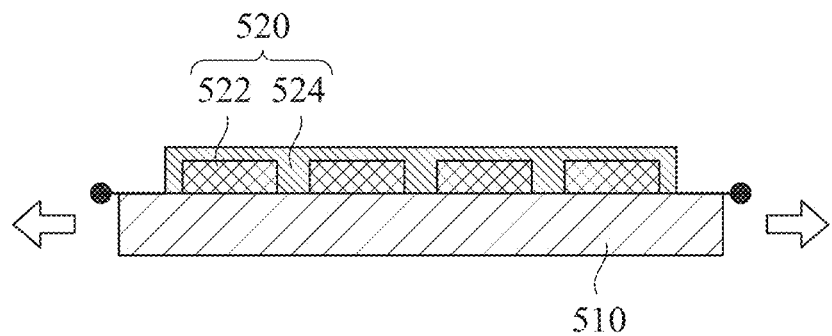
FIG. 9A illustrates a cross-sectional view of an example.

FIG. 9A illustrates a cross-sectional view of example 2. The stress sensing assembly 500 of example 2 includes a stretchable substrate 510 and a stress sensing line 520. The stress sensing line 520 includes a plurality of separated rigid segments 522 and a plurality of interconnected flexible conductive segments 524 overlaying the rigid segments 522. In example 2, the rigid segments 522 have a three-layer structure of titanium-aluminum-titanium, and the material of the flexible conductive segment 524 is a conductive polymer of PEDOT. Further, in the stress sensing assembly 500, the total length of the rigid segments 522 is X, the total length of the parts of the flexible conductive segments 524 that do not overlap with the rigid segments 522 is Y, and Y/X is about 1.

Figure 9B:
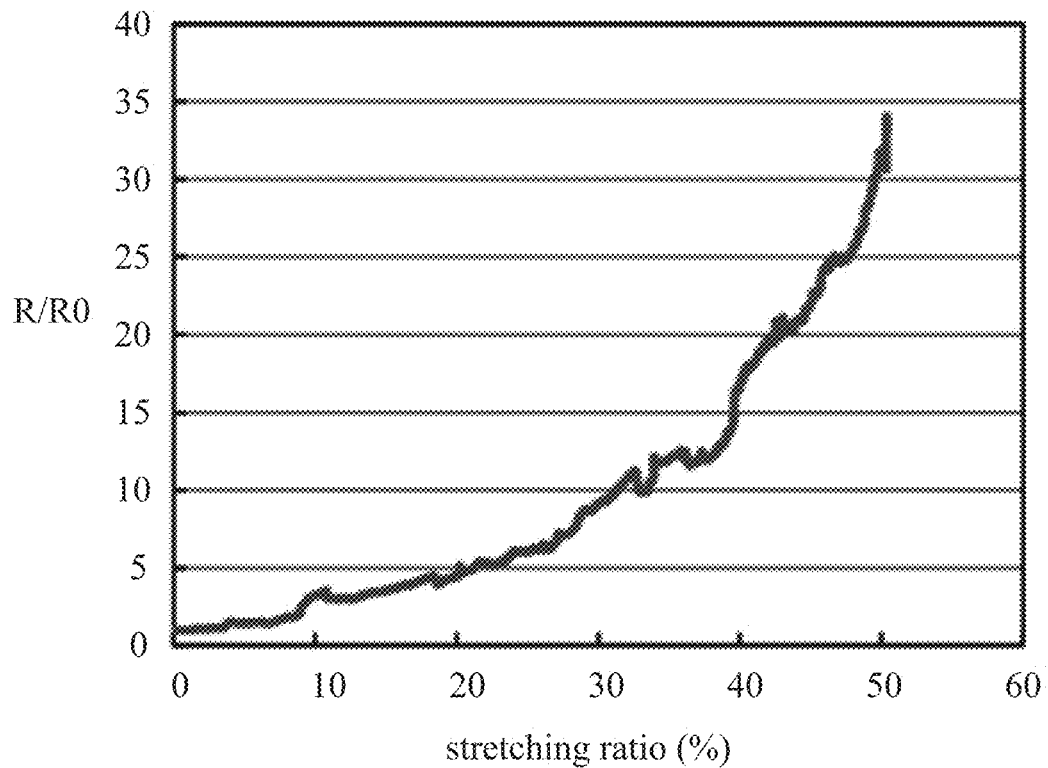
FIG. 9B shows the relationship between the stretching ratio and the resistance change ratio of the example of FIG. 9A.

FIG. 9B shows the relationship between the stretching ratio and the resistance change ratio (R/R0) of example 2 in FIG. 9A. It can be seen that with the increase of the stretching ratio of the stress sensing assembly 500, the resistance change ratio gradually increases. When the stretching ratio of the stress sensing assembly 500 is from the unstretched state to the stretching ratio of 50%, the resistance change ratio increases by more than 30 times.

It can be seen from the tests of comparative examples and experimental examples in FIGS. 6A to 9B above that when a tensile force is applied to the stress sensing line, the lengths of the rigid segments are substantially unchanged, and the deformation of the parts of the underlying stretchable substrate is limited, so that the strain effect of the stretching is mainly concentrated in the broken regions between the rigid segments, that is, the sections respectively filled with the flexible conductive segments. As a result, the amount of deformation of the flexible conductive segments increases significantly, and therefore a larger resistance change ratio can be measured. Therefore, compared with the comparative examples, the stress sensing line of the examples of the present disclosure are much more sensitive to the deformation caused by stretching.

The stress sensing assemblies provided by the various embodiments of the present disclosure can be applied to flexible electronic devices, such as flexible display devices. Flexible display devices mean display devices that can be bent, folded, stretched, flexed, rolled, or the like. In some embodiments, the flexible display device can be a mobile phone, a tablet computer, a notebook computer, a television, a billboard, a digital photo frame, a navigator, a smart wearable display device, or the like.

In some embodiments, in the process of forming the flexible display device, the stress sensing line can be formed on a stretchable substrate in the flexible display device in advance, and then other elements are formed; alternatively, the stress sensing lines may be fabricated together with the display driving array of the flexible display device. In some embodiments, the stress sensing line can be disposed on the same layer of one of the semiconductor active layer, the gate metal layer, or the source/drain metal layer. In some flexible display devices, in order to prevent the display elements from breaking due to bending, the display driving array is arranged on the mechanical neutral axis. In some regions of the flexible display device, the tensile strain of the layer where the display driving array is located is small; for example, the stretching ratio may be less than 1% or less than 0.3%. Therefore, more sensitive stress sensing assemblies are needed to measure smaller strains.

Figure 10A:
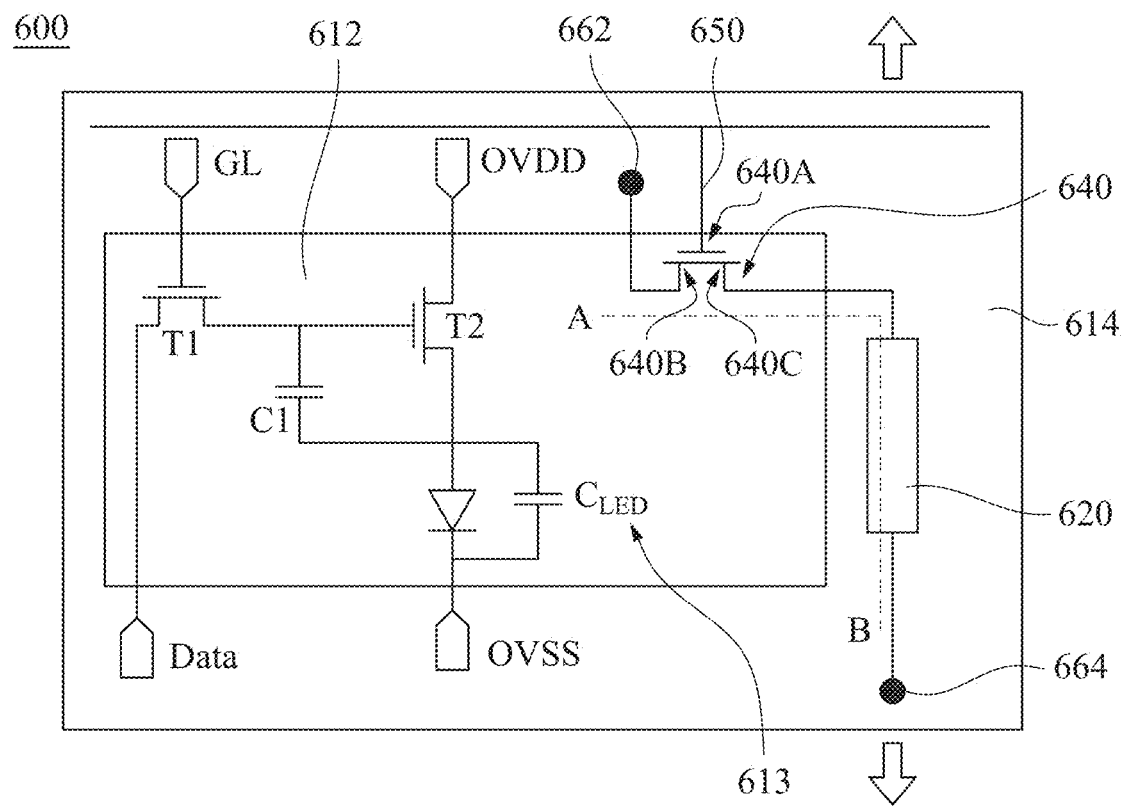
FIG. 10A illustrates a partial top view of a display device according to an embodiment of the present disclosure.
Figure 10B:
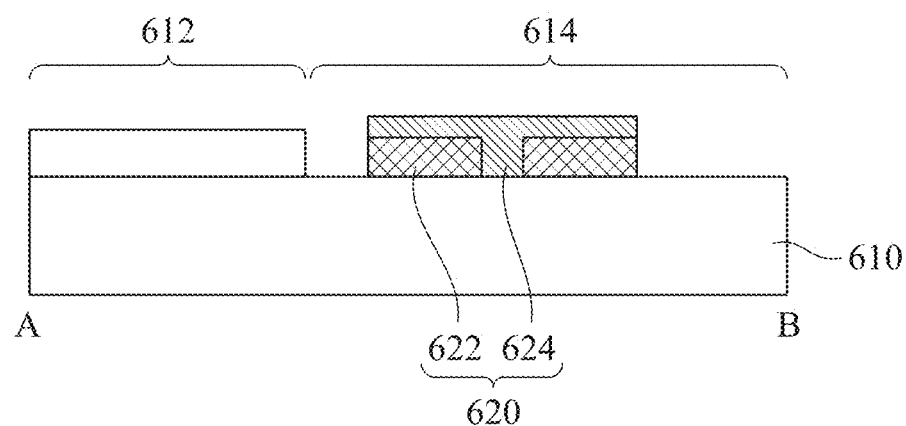
FIG. 10B illustrates a cross-sectional view of the hinged line AB of FIG. 10A.

Referring to FIGS. 10A and 10B, FIG. 10A illustrates a partial top view of a flexible display device. FIG. 10B illustrates a cross-sectional view of the hinged line AB. The flexible display device 600 has a plurality of non-stretching zones 612 and stretching zones 614 on a stretchable substrate 610. The non-stretching zones 612 are positions where the sub-pixels are located. For illustrative purposes, only one sub-pixel 613 is drawn in the non-stretching zone 612 of FIG. 10A. When subjected to stress, the non-stretching zones 612 is not stretched; the tensile deformation of the stretching zones 614 leads the sub-pixels of the non-stretching zones 612 to be located at the desired positions.

For ease of illustration, the sub-pixel structure of FIG. 10A takes two thin-film transistors T1 and T2 with a capacitor C1 as an example, i.e., the 2T1C structure is used to illustrate, but it is not intended to limit this disclosure.

Each of the non-stretching zones 612 is located between the stretching zones 614. Each of the sub-pixels 613 of the non-stretching zones 612 comprises at least one switching element (e.g., thin-film transistors T1 and T2) and a display element (e.g., a display element $C_{LED}$) connected to the switching element. At least one stress sensing line 620 is disposed on one of the stretching zones 614. For illustrative purposes, FIG. 10B illustrates two rigid segments 622 and a flexible conductive segment 624, although the stress sensing line 620 may comprise more rigid segments 622 and more flexible conductive segments 624. In some embodiments, each of the flexible conductive segments 624 is located between two adjacent rigid segments 622. In some embodiments, each of the flexible conductive segments 624 is located between two adjacent rigid segments 622 and overlays at least parts of the rigid segments 622. In some embodiments, the flexible conductive segments 624 are interconnected. In other embodiments, the flexible conductive segments 624 are separated.

As shown in FIG. 10A, a plurality of signal lines are disposed on the non-stretching zone 612 and the stretching zone 614 of the stretchable substrate 610, and the signal lines connect the switching elements of the sub-pixel 613. The signal lines include a power line GL connected to the thin-film transistor T1, a data line Data connected to the thin-film transistor T1, a high voltage power line OVDD and a low voltage power line OVSS connected to the thin-film transistor T2. Further, these signal lines and stress sensing lines 620 located on a same stretching zone 614 are separated from each other and not connected to each other.

In some embodiments, the display element $C_{LED}$ is a self-luminous display element, such as an organic light emitting diode (OLED) or a micro light emitting diode (micro LED). In other embodiments, the display element may be a non-self luminous element, such as liquid crystal.

As shown in FIG. 10A, in the display device 600, the stress sensing assembly further includes a strain reading element 640 coupled to the stress sensing line 620 located in the stretching zone 614. As shown in FIG. 10A, the strain reading element 640 is a transistor located in the non-stretching zone 612. Furthermore, within the same non-stretching zone 612, the strain reading element 640 is separated from and not connected to the thin-film transistors T1 and T2 and the display element $C_{LED}$ of the sub-pixel 613.

In the display device 600, the stress sensing assembly also includes a reading power line 650 and two reading terminals 662 and 664, as shown in FIG. 10A. The reading power line 650 is disposed on the stretchable substrate 610, extends from the stretching zone 614 to the non-stretching zone 612, and connects the strain reading element 640. Further, the first terminal 640A (e.g., a gate terminal) of the strain reading element 640 connects the reading power line 650. In addition, the second terminal 640B of the strain reading element 640 connects the first reading terminal 662, the third terminal 640C of the strain reading element 640 connects the one end of the stress sensing line 620, and the other end of the stress sensing line 620 connects the second reading terminal 664. After the strain reading element 640 is turned on by the voltage at the first terminal 640A, the second terminal 640B and the third terminal 640C will have the same voltage, and the current will be measured by the voltage difference between the third terminal 640C and the reading terminal 662; thus, the resistance change ratio is obtained.

As shown in FIG. 10A, in the display device 600, the reading power line 650 of the stress sensing assembly is separated from and not connected to other signal lines (e.g., the power line GL, the data line Data, the high voltage power line OVDD, and the low voltage power line OVSS) in the same stretching zone.

In some embodiments, the required voltage compensation value for the pixels at different positions of the flexible display device 600 can be calculated by the change ratio of the resistance signal detected by the strain reading element 640, and the voltage of the pixels at different positions can be adjusted according to the required voltage compensation value.

Figure 11A:
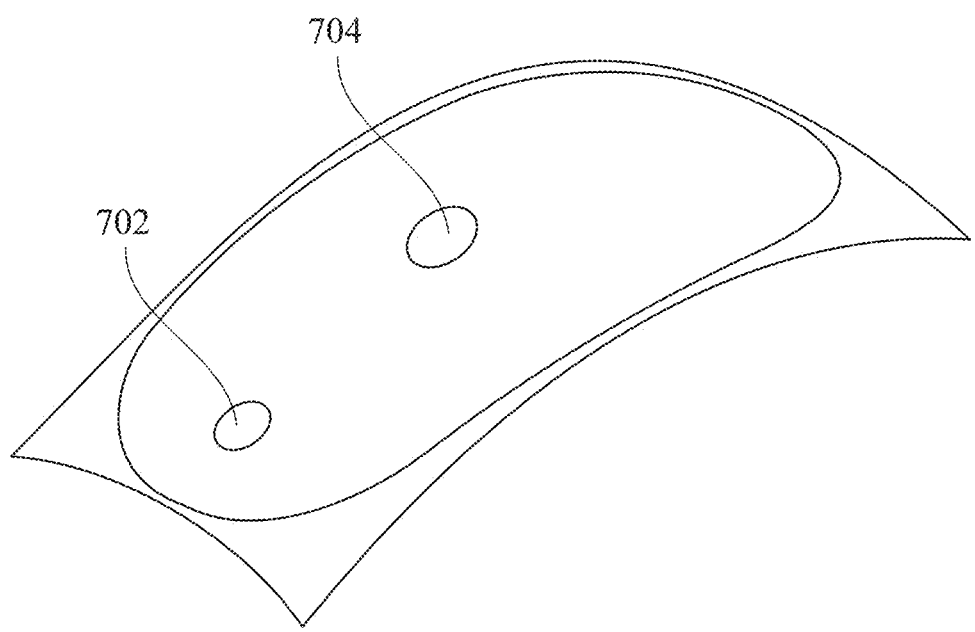
FIG. 11A illustrates a curved display device.

FIG. 11A shows a curved display device. In the display device 700, each of the local regions (e.g., the first region 702 and the second region 704) includes a plurality of non-stretching zones and a plurality of stretching zones, respectively. In the display device 700, the different positions of the stretchable substrate have different stretching ratios. For example, in the display device 700, the stretching ratio of the stretchable substrate in the first region 702 is about 23% to 27%, and the stretching ratio of the stretchable substrate in the second region 704 is about 0.3%. In other words, the stretching ratio of the first region 702 is greater than the stretching ratio of the second region 704.

In some embodiments, stress sensing assemblies are provided in the first region 702 and in the second region 704, respectively. The first region 702 and the second region 704 have different stretching ratios, so the stress sensing lines with different sensitivities can be set for different regions. For example, since the stretching ratio of the second region 704 is small, a stress sensing line capable of sensing a small stretching effect may be provided.

Figure 11B:
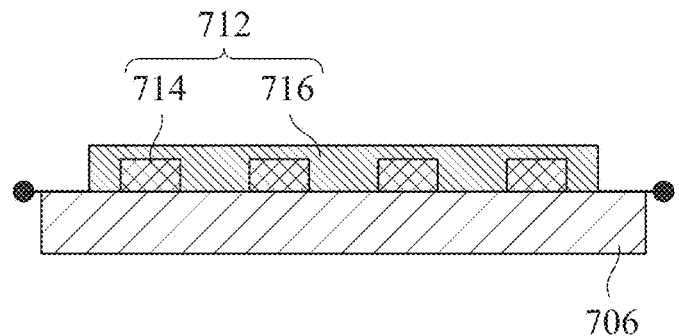
FIG. 11B illustrates a cross-sectional view of the stress sensing assembly in the first region of the display device of FIG. 11A.

FIG. 11B illustrates a cross-sectional view of a stress sensing assembly 710 in the first region 702 of the display device 700. The stress sensing assembly 710 includes a stretchable substrate 706 and a stress sensing line 712 over the stretchable substrate 706. The stress sensing line 712 includes a plurality of rigid segments 714 and a plurality of interconnected flexible conductive segments 716 overlaying the rigid segments 714. In some embodiments, in the first region 702, the total length of the rigid segments 714 of the stress sensing line 712 is X, while the total length of the parts of the flexible conductive segments 716 that do not overlap with the rigid segments 714 is Y, and the ratio of Y/X is between about 0.2 and about 3, such as 0.2, 0.5, 1, 1.5, 2, 2.5, or 3.

Figure 11C:
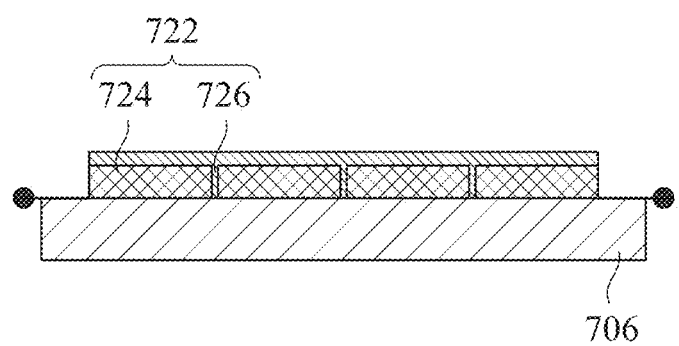
FIG. 11C illustrates a cross-sectional view of the stress sensing assembly in the second region of the display device of FIG. 11A.

FIG. 11C illustrates a cross-sectional view of a stress sensing assembly 720 in the second region 704 of the display device 700. The stress sensing assembly 720 includes a stretchable substrate 706 and a stress sensing line 722 over the stretchable substrate 706. The stress sensing line 722 includes a plurality of rigid segments 724 and a plurality of flexible conductive segments 726 overlaying the rigid segments 724. In some embodiments, in the second region 704, the total length of the rigid segments 724 of the stress sensing line 722 is X, the total length of parts of the flexible conductive segments 726 that do not overlap with the rigid segments 724 is Y, and the ratio of Y/X is between about 0.01 to about 0.5, such as 0.01, 0.05, 0.1, 0.2, or 0.5.

Because the stress sensing line is required to produce a larger resistance change ratio for smaller tensile deformation in the region with a smaller stretching ratio in the display device, the Y/X ratio of the stress sensing line can be set smaller. In addition, in the region with a larger stretching ratio in the display device, it is necessary that the stress sensing line can bear a larger tensile strain, so the Y/X ratio of the stress sensing line can be set larger.

The stress sensing assembly provided by the various embodiments of the present disclosure can sensitively respond to small tensile deformation, so that the subsequent operation performance of the flexible device for tensile deformation is improved.

Although the present disclosure has been disclosed in many embodiments and examples, it is not intended to limit the present disclosure. Anyone skilled in the art can make various changes and modifications without departing from the spirit and scope of the present disclosure. Therefore, the scope of protection of the present disclosure shall be subject to the scope of the appended claims.

What is claimed is:

1. A stress sensing assembly comprising:
a stretchable substrate; and
at least one stress sensing line, disposed over the stretchable substrate, wherein the at least one stress sensing line comprises:
rigid segments, wherein the rigid segments are separated from each other; and
flexible conductive segments, wherein each of the flexible conductive segments is disposed between two adjacent rigid segments of the rigid segments and directly contacts sidewalls of the two adjacent rigid segments, and Young's modulus of one of the flexible conductive segments is smaller than Young's modulus of one of the rigid segments.

2. The stress sensing assembly of claim 1, wherein each of the flexible conductive segments overlays and directly contacts parts of surfaces of the two adjacent rigid segments of the rigid segments.

3. The stress sensing assembly of claim 1, wherein the flexible conductive segments overlay and directly contact entire upper surfaces of the rigid segments.

4. The stress sensing assembly of claim 1, wherein two flexible conductive segments at two ends of the stress sensing line respectively overlay and directly contact outer sidewalls of two rigid segments closest to the two ends of the stress sensing line.

5. The stress sensing assembly of claim 1, wherein a total length of the rigid segments is X, a total length of parts of the flexible conductive segments that do not overlap with the rigid segments is Y, and a ratio of Y/X is between 0.01 to 3.

6. The stress sensing assembly of claim 1, further comprises Young's modulus of the stretchable substrate is smaller than the Young's modulus of one of the rigid segments.

7. The stress sensing assembly of claim 1, wherein the stress sensing line is a bending line, and a bending portion of the bending line is one of the flexible conductive segments.

8. The stress sensing assembly of claim 1, wherein a material of the rigid segments is conductive material, non-conductive material, or a combination thereof.

9. The stress sensing assembly of claim 1, wherein the Young's modulus of the one of the rigid segments ranges from 30 GPa to 400 GPa, and the Young's modulus of the one of the flexible conductive segments ranges from 0.01 MPa to 1 GPa.

10. The stress sensing assembly of claim 1, further comprises Young's modulus of the stretchable substrate ranges from 0.1 MPa to 10 GPa.

11. The stress sensing assembly of claim 1, further comprises: at least one strain reading element, at least one reading power line, and two reading terminals disposed over the stretchable substrate, wherein a first terminal of the strain reading element connects the at least one reading power line, a second terminal of the strain reading element connects one of the two reading terminals, a third terminal of the strain reading element connects one end of the at least one stress sensing line, the other one of the two reading terminals connects the other end of the at least one stress sensing line.

12. A display device comprising:
the stress sensing assembly of claim 11, wherein the stretchable substrate has non-stretching zones and stretching zones, each of the stretching zones is located between two adjacent non-stretching zones of the non-stretching zones, each of the non-stretching zones has sub-pixels, each of the sub-pixels comprises at least one switching element and a display element connected with the at least one switching element, and the at least one stress sensing line is disposed on one of the stretching zones; and
a plurality of signal lines, the signal lines are disposed on the non-stretching zones and the stretching zones of the stretchable substrate, the signal lines connect the at least one switching element of one of the sub-pixels, and the signal lines and the at least one stress sensing line located on a same one of the stretching zones are separated from each other and not connected with each other;
wherein each of the non-stretching zone further comprises at least one strain reading element, and within a same one of the non-stretching zones, the at least one strain reading element and the at least one switching element and the display element of one of the sub-pixels are separated from each other and not connected to each other.

13. A display device comprising:

the stress sensing assembly of claim 11, wherein the stretchable substrate has non-stretching zones and stretching zones, each of the stretching zones is located between two adjacent non-stretching zones of the non-stretching zones, each of the non-stretching zones has sub-pixels, each of the sub-pixels comprises at least one switching element and a display element connected with the at least one switching element, and the at least one stress sensing line is disposed on one of the stretching zones; and a plurality of signal lines, the signal lines are disposed on the non-stretching zones and the stretching zones of the stretchable substrate, the signal lines connect the at least one switching element of one the sub-pixels, and the signal lines and the at least one stress sensing line located on a same one of the stretching zones are separated from each other and not connected with each other;

wherein the at least one reading power line is disposed on one of the stretching zones, wherein the signal lines and the at least one reading power line on the same one of the stretching zones are separated from each other and not connected with each other.

14. A display device, comprising:

the stress sensing assembly of claim 1, wherein the stretchable substrate has non-stretching zones and stretching zones, each of the stretching zones is located between two adjacent non-stretching zones of the non-stretching zones, each of the non-stretching zones has sub-pixels, each of the sub-pixels comprises at least one switching element and a display element connected with the at least one switching element, and the at least one stress sensing line is disposed on one of the stretching zones; and a plurality of signal lines, disposed on the non-stretching zones and the stretching zones of the stretchable substrate, wherein the plurality of signal lines connects the at least one switching element of one of the sub-pixels, and the plurality of signal lines and the at least one stress sensing line located on a same one of the stretching zones are separated from each other and not connected with each other.

15. The display device of claim 14, wherein the stretchable substrate comprises a first region and a second region, the first region and the second region respectively comprise the non-stretching zones and the stretching zones, and a stretching ratio of the first region is greater than a stretching ratio of the second region; and wherein a total length of the rigid segments is X, a total length of parts of the flexible conductive segments that do not overlap with the rigid segments is Y, and a Y/X ratio of the at least one stress sensing line of one of the stretching zones in the first region is greater than a Y/X ratio of the at least one stress sensing line of one of the stretching zones in the second region.

16. The display device of claim 15, wherein the Y/X ratio of the at least one stress sensing line of one of the stretching zones in the first region is between about 0.2 to about 3, and the Y/X ratio of the at least one stress sensing line of one of the stretching zones in the second region is between about 0.01 to about 0.5.

* * * * *